United States Patent Office 3,103,201
Patented Sept. 10, 1963

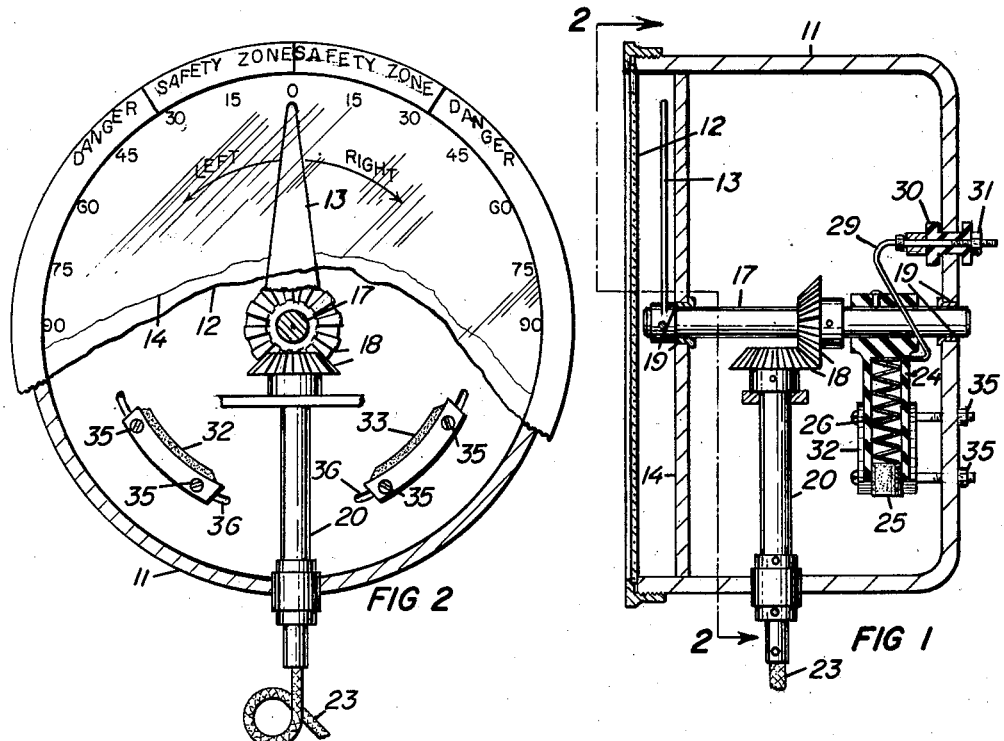
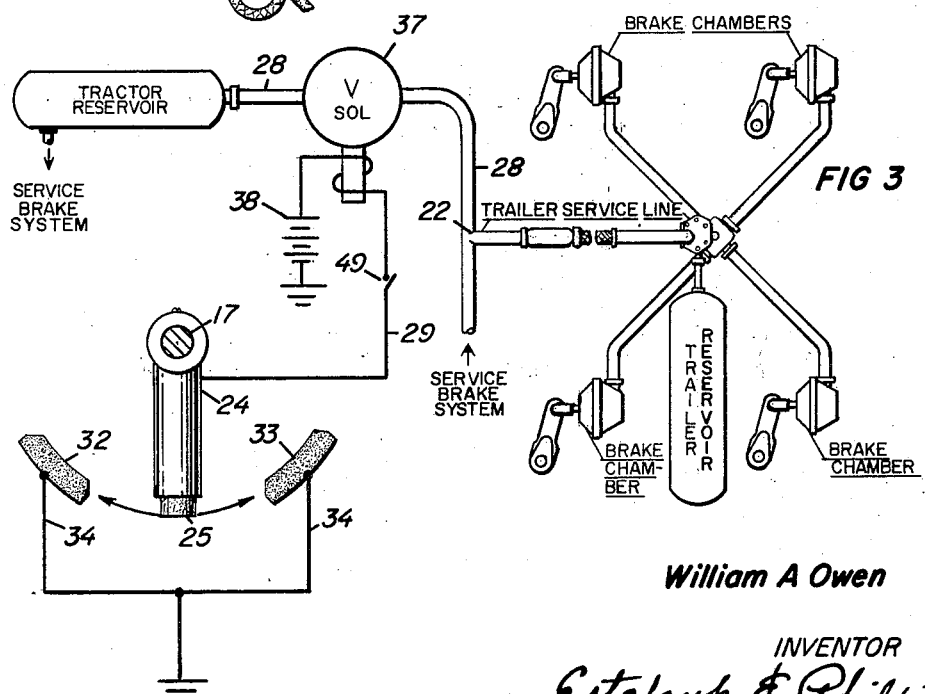

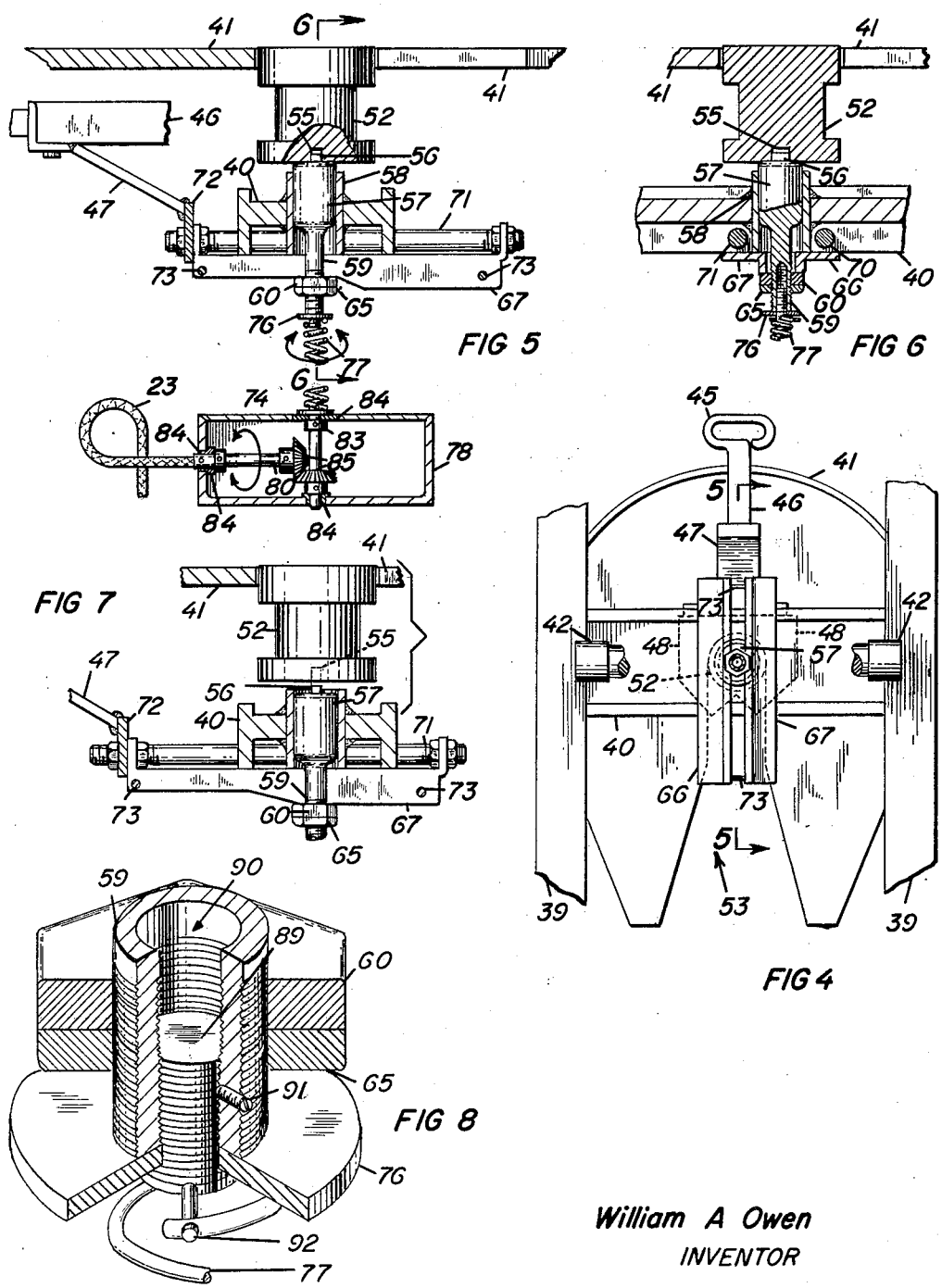

3,103,201
ACCIDENT PREVENTING SYSTEMS FOR ARTICULATED VEHICLES
William A. Owen, 401 E. Chilhowie Ave., Johnson City, Tenn.
Filed Aug. 23, 1960, Ser. No. 51,390
5 Claims. (Cl. 116—28)

This invention relates to tractor-trailer combinations, and more particularly to means associated therewith for constantly indicating to the driver the angle between the longitudinal axes of the tractor and trailer and for actuating the brakes on the trailer when said angle exceeds a predetermined number of degrees.

Freedom of movement between the tractor and trailer, while necessary, creates many practical problems in the day-to-day operation of tractor-trailer units. One of the many problems is jackknifing, which is the occurrence of a pivoting of the trailer about its vertical axis of rotation with respect to the tractor through an angle great enough to throw the vehicle out of control. It has been the cause of many accidents and it often occurs while the driver's attention is diverted by other matters such as a steep hill requiring frequent changes of gears, a sharp curve, a slippery patch of pavement, or an obstruction which suddenly appears on the road ahead.

The addition to an articulated vehicle of means to prevent this particular kind of wreck is very worthwhile from the standpoint of safety, because of the frequency of its occurrence.

In order to fully understand the import of the present invention, it is necessary to understand that the previously suggested systems included means to sense the bending of the vehicle, and means to apply a corrective force in response thereto. This invention is capable of performing not only the prior art functions of sensing the bending of the vehicle and applying a corrective force in response thereto, but also the additional function of constantly indicating to the vehicle driver the angle of the trailer relative to the tractor. In the claims appended hereto, the term "means to apply a corrective force" is meant to refer to any automatic device for preventing the jackknifing of an articulated vehicle of any type.

Therefore it is a primary object of this invention to provide means for communicating to the driver of an articulated vehicle the relative angle between the tractor and trailer units. Another object of this invention is to provide means for indicating the angle between the coupled units of an articulated vehicle, said means also being adaptable for use on tractor-trailers having no automatic anti-jackknife system. A further object of this invention is to provide, in combination, means for constantly communicating to the driver the magnitude of the angle between the coupled units of an articulated vehicle and means for operating the brakes on the trailer when said angle exceeds a predetermined amount. A further object of this invention is to provide an improved brake control device requiring only slight modification of the towed vehicle for ease and economy of installation of the device on large fleets of trailers. Still another object of this invention is to make available for tractor-trailer combinations a trailer-brake control system which requires the driver to make during the trailer coupling operation, only those connections which are ordinarily made on tractor-trailer combinations not equipped with the control. Another object of this invention is to provide a control which may be added to the existing brake system of an articulated vehicle for automatically bringing the vehicle under control before the angle between the tractor and trailer is sufficient to cause a wreck.

Generally speaking, my invention is characterized by
(A) A sensing means which reacts to the bending movements between connected units of an articulated vehicle to produce a signal utilizable in determining the relative angle between the longitudinal axes of said units.
(B) One or more vehicle safety devices, for example, an indicator and/or an automatic anti-jackknifing system, said safety device or devices being operatively linked to said sensing means for operation in response to the signal from said sensing means.
(C) Optionally, when needed, a transmitting device to relay the signal from the sensing means to the safety device when said safety device is positioned on the vehicle at a point remote from said sensing means.

In the accompanying drawings and in the following description, I have shown a preferred embodiment of this invention. This is only one of many forms in which this invention may be embodied and it is understood that the above-mentioned essential elements are not limited to any specific construction but may be embodied in various forms without departing from the spirit of the invention. It should also be understood that although parts have been identified in the following description by specific names for convenience, they are intended to be generic in their application to similar parts.

In the drawings in which the same reference numerals refer to like parts throughout the several views and in which sections are taken looking in the directions of the arrows at the ends of the section lines:

FIGURE 1 is a vertical sectional view of a vehicle safety device as shown in FIGURE 2, and referred to herein as "the indicator." Also shown in the same view is an electric brush and wiper contact for controlling an automatic brake system.

FIGURE 2 is a front view of the indicator showing the dial with a portion section broken away to reveal the wiper contacts mounted on the inside of the back wall of the case.

FIGURE 3 is a schematic diagram of a brake actuating system for use in conjunction with the indicator, brush and wiper assembly, transmitter and sensing means.

FIGURE 4 is a bottom view of a fifth wheel tractor-trailer hitch taken from beneath the tractor frame and showing the sensing means of my invention in place beneath the trailer king-pin.

FIGURE 5 is a fragmentary sectional view on a reduced scale showing the trailer king-pin, the sensing means in engagement therewith and a portion of the transmitter connected to the sensing means.

FIGURE 6 is a sectional view of the sensing means in engagement with the fifth wheel taken about on the line 6—6 of FIGURE 5, looking in the direction of the arrows, showing the supporting shafts and cams of the sensing means carriage.

FIGURE 7 is a side sectional view of the king-pin, sensing means, and carriage with the carriage shifted to hold the sensing means disengaged from the king-pin.

FIGURE 8 is a further enlarged sectional perspective view of the assembly joining the sensing means of the transmitter with provision for longitudinal and rotational adjustment.

*A Vehicle Safety Device—the Indicator*

The purpose of the indicator, which is located in the driver's compartment or station of an articulated vehicle, is to convert signals from the sensing means as to the relative angle between two units of said vehicle, into information which is of aid to the driver in preventing accidents. It also has utility in the backing of tractor-trailers because it makes it unnecessary for the driver to lean out of the tractor cab to ascertain the angle between the tractor and trailer. It will warn the driver if his trailer is fish-tailing.

In this embodiment, the indicator is a meter having a dial face 14 calibrated in degrees and supported within a case 11, as shown in FIGURE 1. The pointer 13 is fixedly secured on the pointer shaft 17 which is journalled in bushings 19 in the face 14, and in the back wall of the case 11. A cover glass 12 protects the dial and pointer 13. The pointer shaft is rotatable by shaft 20 through bevel gears 18.

The shaft 20 may be coordinated in a suitable manner with any means capable of sensing the angle between the coupled units of the vehicle and producing a signal utilizable by the indicator. Although there are many means by which the bending of the vehicle can be sensed and transmitted to the indicator, I have chosen to illustrate the sensing means in an embodiment associated with a fifth wheel and to illustrate the transmitter as a flexible cable and gear box which will subsequently be explained in detail. For the purpose of understanding the operation of this example of an indicator, it is necessary only to note that the indicator receives a rotary signal from the sensing means which rotates in unison with the trailer king-pin and transmits said rotation to the indicator via the indicator gear box and flexible cable 23. Thus as the vehicle bends and the trailer king-pin rotates in the fifth wheel, the sensing means and transmitter cooperate to produce change in the position of pointer 13 in the indicator which corresponds to the change in the angle between the axes of the tractor and trailer. Thus the indicator, which is calibrated to read 0° when said longitudinal axes exactly coincide, gives the driver a constant indication of the position of the tractor and trailer relative to each other.

*A Second Type of Vehicle Safety Device—an Automatic Brake Control in Combination With the Indicator*

The indicator may optionally be provided with means for actuating any suitable type of anti-jackknifing control in the event that the bending of the vehicle progresses to the danger point without being corrected by the driver. For example, the indicator may be fitted with wiper contacts and a movable brush which are operatively associated with the indicator mechanism to serve as make and break switches in an electrical circuit for applying the trailer brakes. Then, whenever the bending of the vehicle exceeds a predetermined value which is sufficiently acute to make jackknifing a present possibility, the brush and one of the wiper contacts are brought into engagement by rotation of the indicator mechanism to operate the trailer brakes in time to prevent a wreck, without the intervention of the driver. However, the driver, who knows the angle required to activate the automatic brake system, may observe the pointer 13 and obtain advance warning of the impending danger.

In this particular embodiment of my invention a brush holder 24 is fixedly secured to the pointer shaft 17. Within the brush holder 24 is a cavity, in which is mounted a brush spring 26 which terminates at its outer end in a brush 25. The inner end of the brush spring 26 is connected to a conductor 29 which passes through the brush holder wall to a terminal assembly 31, which passes through insulating grommet 30 and is in turn attached to the solenoid valve 37 by means of a continuation of conductor wire 29, as shown in FIGURE 3.

FIGURE 2 shows a front view of the left and right wiper contacts 32 and 33, which are secured to the back wall of the case 11 by mounting screws 35 passing through slots 36 in the case back wall. It should be noted that the slots 36 are oblong in shape to allow for adjustment in the position of the wiper contacts 32 and 33. This makes it possible to adjust the degree of vehicle bending which the control will tolerate before operating. There is an angular displacement of 180° between pointer 13 and the brush holder 24. Therefore when the pointer 13 is pointing straight up at 0° on the indicator, the brush 25 is hanging straight down below the pointer shaft 17 halfway between the wiper contacts 32 and 33. The wiper contacts are positioned far enough away from the dead center position of the brush, so that the brush will not engage either of the wiper contacts on turns made in ordinary open road driving.

*The Brake Actuating System*

A brake actuating system usable in connection with the indicator adaptation explained above is shown in the schematic diagram, FIGURE 3. The wiper contacts 32 and 33 are grounded to the case of the indicator 11, which is grounded to the tractor frame. The brush 25 is connected in the manner previously explained to the conductor wire 29 which is connected to one side of an on-off switch 49 between the brush 25 and solenoid valve 37 which remains positively closed when the circuit is broken and opens when the circuit is closed. The other side of the solenoid valve is connected to the positive side of a battery 38 of which the negative terminal is grounded. Through a pipe 28, which is connected to the tractor reservoir, the solenoid valve 37 is able to admit air under pressure to the trailer service line through a T fitting 22 on the tractor side of the trailer service line coupling. The switch 49 may be employed by the driver at any time when he does not wish the brake actuating system to function automatically, for instance when negotiating a right angle turn in a city or town. The presence of this switch makes it possible to set the wiper contacts to complete the circuit whenever the bending of the vehicle exceeds the maximum normal open road angle on approximately 30° without having the control operate every time the vehicle negotiates a sharp corner in a city or town.

The solenoid valve and pipe 28 take no part in the ordinary service applications of the tractor-trailer brakes and do not interfere with them in any way. If the vehicle careens out of control developing an angle between the longitudinal axes of the tractor and trailer sufficient to bring the brush 25 into contact with either of the wiper contacts 32 or 33, current from the battery flows through ground to either of the wiper contacts 32 and 33 and through the brush 25, spring 26 and connector wire 29 to the solenoid valve 37, admitting high-pressure air from the tractor reservoir through pipe 28 to the trailer service line and the relay emergency valve on the trailer. In turn, the relay emergency valve admits high-pressure air stored in the trailer reservoir to the brake chambers on the trailer wheels, applying a correctional force to straighten out the vehicle.

*The Sensing Means*

The purpose of the sensing means is to translate the changes in angular relationship between the tractor and trailer into a signal to coordinate the operation of one or more vehicle safety devices with the changes in relative position between coupled units of said vehicle. The sensing means embodied herein operates in cooperation with the king-pin of the trailer, and is mounted in a tractor frame member directly below the position occupied by the trailer king-pin when the vehicle units are coupled for ordinary highway operation. Specifically, as shown in FIGURE 4 longitudinal tractor frame members 39 are connected by transverse frame member 40, above which is disposed the fifth wheel upper bearing plate 41, the fifth wheel locking jaws 48, and a mechanism for opening and closing said jaws for purposes of coupling and uncoupling a trailer. However, for purposes of illustration I have shown a locking mechanism which includes a handle 45 and an actuating rod 46 for connecting said hadle to the jaw mechanism.

Referring now to FIGURE 5, it will be observed that the actuating rod 46 is connected by means of a bar 47 to a slidably mounted carriage supported by the transverse frame member 40. The carriage consists of a reinforcing plate 72 at one end thereof to which is fastened a pair of horizontally disposed parallel shafts 70 and 71 (see FIGURE 6) and a pair of parallel cam members 66 and 67 formed of angle iron stock. At both of its ends, each of said cam members is supported from above by one of the shafts 70 and 71 and each of the cams is also rigidly held in a parallel spaced apart relationship with the other cam by dowels 73. The carriage, being a rigid unit connected to the jaw opening mechanism through the bar 47, slides back and forth whenever the fifth wheel lock handle is operated.

In a sleeve 58 welded in a vertical hole in the transverse frame member 40 between the carriage shafts 70 and 71 is a keyed slug or piston member 57 which engages a slot 55 in the king-pin 52. The purpose of the carriage and its connection to the jaw operating mechanism is to automatically insure that the key 56 does not interfere with coupling and uncoupling of the trailer by withdrawing the slug or piston member and key 56 from its king-pin contacting position (as shown in FIGURE 7) whenever the fifth wheel jaws are unlocked to admit or release a trailer king-pin.

Connected to the lower end of the slug 57 is a spring 77 for biasing the slug upwards against the lower face of the king-pin and holding the key 56 in place in the king-pin slot 55. The force necessary to overcome the action of said spring and withdraw the slug 57 from the king-pin slot 55 is transmitted to said slug through a nut 60 threaded upon a lower portion of said slug which is reduced in diameter. The spacing between the cams 66 and 67 is such that the separation between their depending parallel sides is slightly greater than the diameter of said reduced portion 59 but less than the diameter outside diameter of the hexagonal nut 60. The nut 60 is backed up by a lock nut 65 to prevent movement thereof.

Springs means 77 serves a dual purpose. Not only does it bias the slug 57 upwards against the kingpin 52 but it also serves to transmit any rotational movements of the slug 57 to the vertical shaft 79 in the transmitter gear box 78. The slug 57, which closely fits the interior of the sleeve 58, is forced to turn with the trailer king-pin, causing the vertical shaft 79 in the transmitter gear box to rotate in unison with the trailer king-pin as it turns relative to the tractor axis.

Since it may be necessary from time to time to alter the angular relation between the key 56 on slug 57 and the vertical shaft 79 in the transmitter gear box, the sensing means is provided with an adjusting device shown in FIGURE 8. The lower reduced portion 59 of the slug is drilled and provided with internal threads 90 to receive the end of a headless machine screw 89. The lower end of said machine screw 89 is drilled to receive a pin 92 which is secured to diametrically opposed portions of the top-most coil in spring 77. A washer 76 is provided between the top coil of the spring and the lower end of the slug 59 to stabilize the spring against wobbling. A set screw 91, threaded into a hole in the annular lower portion of the slug is utilized for the purpose of locking the machine screw 89, and therefore the spring 77, against further rotation with respect to the slug 57, whenever the desired calibration has been effected.

While the sensing means has been illustrated in connection with a fifth wheel type coupling, those skilled in the art will be able to recognize that the sensing means may be adapted to many types of well-known couplings other than the fifth wheel type.

I wish to make it clear that the term sensing means does not include the automatic retracting mechanism. The automatic retracting mechanism is embodied herein in the following parts: bar 47, cams 66 and 67, shafts 70 and 71, dowels 73 and reinforcing plate 72; and the term automatic retracting mechanism as used in the appended claims refers to any assembly performing the same function in devices of like character.

The function of the transmitter is to communicate rotations of the sensing means to the indicator. This function is carried out by a transmitter gear box 78 and the flexible cable 23. (See FIGURES 1, 2 and 5). In the gear box, numerals 83 designate collars to prevent longitudinal travel of the bevel gears 85 mounted on shafts 79 and 80. Said shafts are journalled in bushings 84 mounted in the walls of the gear box. The horizontal shaft 80 is driven by the vertical shaft 79 through bevel gears 85, and it in turn drives the flexible cable 23 which connects directly with the indicator in the cab of the truck.

Having thus described my invention, I claim:

1. In an indicating system of the class described, the combination comprising, a tractor vehicle, a driver's station within said tractor vehicle, a trailer vehicle, fifth wheel and king pin means on said tractor and trailer for pivotally interconnecting said tractor and trailer, position responsive sensing means at said connection responsive to variations in the relative positions of said tractor and said trailer, and indicating means at said driver's station operatively connected to said sensing means for indicating the relative angular relationship of said tractor and said trailer, disconnecting means for operatively disassociating said sensing means and said indicating means, said disconnecting means including a piston member carried by said fifth wheel, means defining a slot in said king pin engaged by said piston member, a tongue on said piston member engaging said slot, and piston retracting cam means to withdraw said piston and said tongue from said slot to render said indicating means inoperative.

2. In a system of the class described, in combination, a tractor vehicle, a trailer vehicle pivotally connected to the tractor vehicle, brake means for said vehicles, position responsive sensing means connected to both vehicles to determine the relative relationship of the longitudinal axes of said vehicles, an indicator connected to said sensing means to indicate said relative relationship, and relative position responsive actuating means on said indicator to actuate the brake means when the indicated angular relationship of the axes aforesaid exceeds a preselected degree.

3. In a system of the class described, in combination, a tractor vehicle, a trailer vehicle, brake means for the trailer vehicle, position responsive sensing means connected to both vehicles to determine the relative relationship of the longitudinal axes of said vehicles, indicating means operatively connected to said sensing means for indicating the relative relationship of the longitudinal axes of said vehicles, and control means selectively actuated by the indicating means when the relative angular relationship of the axes of said vehicles exceeds a preselected degree, to apply said brake means.

4. The combination as claimed in claim 3, wherein the vehicles are pivotally connected at a common axis, said tractor vehicle including a driver's station, said indicator disposed at said driver's station, sensing means mounted at said common axis operatively connected to said indicator, and said control means operatively connected to said indicator and selectively connected to said brake means when said indicator indicates a preselected angular relationship between said tractor and said trailer.

5. In a system of the class described, in combination, a tractor vehicle, a driver's station within said tractor, a trailer vehicle pivotally connected to said tractor vehicle, brake means for said tractor and trailer vehicles, position responsive sensing means at said pivotal connection connecting said tractor and said trailer to determine the relative relationship of the longitudinal axes of said vehicles, indicator means operatively connected to said sensing means for indicating the relative relationship of the longitudinal axes of said vehicles, and control means responsive to changes in said relative position of said vehicle of a preselected magnitude selectively actuated by said indicator means to apply said brake means of said trailer vehicle.

References Cited in the file of this patent

UNITED STATES PATENTS

| | | |
|---|---|---|
| 2,214,161 | Cater | Sept. 10, 1940 |
| 2,259,923 | Byrne et al. | Oct. 21, 1941 |